United States Patent [19]

Takado

[11] Patent Number: 5,767,179
[45] Date of Patent: Jun. 16, 1998

[54] LITHIUM-ALUMINUM HYDROXIDE COMPLEX WITH CONDENSED SILICATE

[75] Inventor: Kanemasa Takado, Kamiichi, Japan

[73] Assignee: Fuji Chemical Industry Co., Ltd., Toyama, Japan

[21] Appl. No.: 793,250

[22] PCT Filed: Jun. 21, 1996

[86] PCT No.: PCT/JP96/01717

§ 371 Date: Feb. 21, 1997

§ 102(e) Date: Feb. 21, 1997

[87] PCT Pub. No.: WO97/00828

PCT Pub. Date: Jan. 9, 1997

[30] Foreign Application Priority Data

Jun. 23, 1995 [JP] Japan ................ 7-180655
Mar. 29, 1996 [JP] Japan ................ 8-104180

[51] Int. Cl.⁶ .............. C08K 5/3435; C01B 33/26; A01G 7/00
[52] U.S. Cl. ............ 524/103; 47/9; 252/587; 423/328.2; 524/492; 523/135
[58] Field of Search .......... 423/328.2; 252/587; 523/135; 47/2, 9, 19, 28.1, 29, 31, 32; 524/449, 450, 492, 103

[56] References Cited

U.S. PATENT DOCUMENTS

| | | | |
|---|---|---|---|
| 4,075,784 | 2/1978 | Pied | 47/9 |
| 4,542,061 | 9/1985 | Fukushi et al. | 47/9 |
| 4,686,791 | 8/1987 | Miyata | 47/29 |
| 4,919,908 | 4/1990 | Blom | 423/328 |
| 5,102,562 | 4/1992 | Brace et al. | 423/328 |
| 5,217,702 | 6/1993 | Frianeza-Kullberg | 423/600 |
| 5,262,233 | 11/1993 | Sudo et al. | 47/29 |
| 5,407,654 | 4/1995 | Tissler et al. | 423/328.2 |
| 5,616,310 | 4/1997 | Edwards et al. | 423/328.2 |

FOREIGN PATENT DOCUMENTS

| | | |
|---|---|---|
| 6-69886 | 9/1994 | Japan . |
| 07126605 | 5/1995 | Japan . |

*Primary Examiner*—Veronica P. Hoke
*Attorney, Agent, or Firm*—Harold L. Novick; Nath & Associates

[57] ABSTRACT

A novel hydroxide complex with condensed silicate represented by the formula (I)

$$[Al_2(Li_{(1-x)}M^{2+}_x)(OH)_6]_2(Si_yO_{2y+1}{}^{2-})_{1+x} \cdot mH_2O \qquad (I)$$

wherein $M^{2+}$ is a divalent metal, m, x and y are numbers respectively in the ranges of $0 \leq m < 5$, $0 \leq x < 1$ and $2 \leq y \leq 4$, a process for preparing the same, an infrared absorber containing the same as an effective ingredient, and an agricultural film containing said infrared absorber.

9 Claims, 9 Drawing Sheets

LITHIUM-ALUMINUM HYDROXIDE COMPLEX WITH CONDENSED SILICATE

TECHNICAL FIELD

The present invention relates to a novel hydroxide complex with condensed silicate represented by the formula (I)

$$[Al_2(Li_{(1-x)} \cdot M^{2+}_x)(OH)_6]_2(Si_yO_{2y+1}^{2-})_{1+x} \cdot mH_2O \quad (I)$$

wherein $M^{2+}$ is a divalent metal, m, x and y are numbers respectively in the ranges of $0 \leq m < 5$, $0 \leq x < 1$ and $2 \leq y \leq 4$, a process for its preparation, an infrared absorber and an agricultural film each containing it.

BACKGROUND ART

An agricultural film which is being used in a greenhouse cultivation such as growing in houses or tunnels is required to have characteristic properties such that infrared rays radiated from the ground and plants are prevented from being liberated outside the houses or tunnels by the absorption, reflection, etc. during the night while the sunlight is transmitted efficently at a high transmission rate into the houses or tunnels during the daytime. It is known that the infrared rays radiated at a high radiation rate from the ground and plants lie in wavelengths ranging from 5 to 25 μm. It is required for the agricultural film to be capable of absorbing infrared rays having wavelengths from 5 to 25 μm, especially wavelengths in the vicinity of 10 μm which is the maximum radiation rate.

For the above agricultural film, magnesium carbonate, magnesium silicate, silicon dioxide, aluminum oxide, barium sulfate, calcium sulfate, magnesium hydroxide, aluminum hyroxide, calcium hydroxide, phosphates, silicates, hydrotalcites have been hitherto employed as infrared absorbers.

However, these inorganic powders have both respective merits and demerits, and none of them fully meet the above requirements for properties. For example, silicon dioxide and magnesium sulfate are excellent in the infrared absorptivity but have problems in the refractive index and dispersibility with the result that the resultant final films have poor light transmittance. Thus, they are not suitable for use as the agricultural films. Also, hydrotalcites are relatively excellent in the dispersibility and refractive index but the resultant final films containing them do not have satisfactory infrared absorptivity.

DISCLOSURE OF THE INVENTION

It is an object of the present invention to provide a novel hydroxide complex salt which has a high ability to absorb infrared rays and good dispersibility when incorporated into a resin, and which has a refractive index close to that of the resin, and which is suitable to impart excellent heat insulation property and transparency when the resin composition is formed into a film and to provide a process for preparing it, an infrared absorber and an agricultural film each containing it.

As a result of having ardently studied to solve the above problems, the present inventors have found that condensed silicate ion has a high ability to absorb infrared rays having wavelengths in the vicinity of 10 μm, and have further found that the above problems may be solved by intercalating condensed silicate ions into the interlayers of a basic hydroxide complex salt which has the basal skeleton composed of an aluminum hydroxide octahedron layer of the gibbsite structure and which is represented by the formula (II)

$$[Al_2(Li_{(1-x)} \cdot M^{2+}_x)(OH)_6]_n(A^{n-})_{1+x} \cdot mH_2O \quad (II)$$

wherein $M^{2+}$ is a divalent metal, m and x are numbers respectively in the ranges of $0 \leq m < 5$, $0 \leq x < 1$ and $A^{n-}$ is an anion having a valence of n, and have completed the present invention.

That is, the present invention relates to a hydroxide complex condensed silicate represented by the formula (I)

$$[Al_2(Li_{(1-x)} \cdot M^{2+}_x)(OH)_6]_2(Si_yO_{2y+1}^{2-})_{1+x} \cdot mH_2O \quad (I)$$

wherein $M^{2+}$ is a divalent metal, m, x and y are numbers respectively in the ranges of $0 \leq m < 5$, $0 \leq x < 1$ and $2 \leq y \leq 4$ (hereinafter, referred to as Compound (I)), an infrared absorber and an agricultural film each containing Compound (I) as an effective ingredient.

The Compound (I) shown in the above is one whose basal skeleton is formed by entering a lithium and a divalent metal ions into a vacant site of an aluminum hydroxide octahedron layer of the gibbsite structure and whose interlayers are intercalated with a condensed silicate ion. As divalent metals, they are not limited particularly. However, Mg, Zn and Ca are preferred from the viewpoints that they enable easy intercalation and give white colored products and satisfactory transparency when incorporated into a film.

Also, Compound (I) of the present invention includes a hydroxide complex condensed silicate where x in the above formula (I) is 0, namely none of divalent metal $M^{2+}$ is entered as represented by the following formula (III)

$$[Al_2Li(OH)_6]_2(Si_yO_{2y+1}^{2-}) \cdot mH_2O \quad (III)$$

wherein m and y are numbers respectively in the ranges of $0 \leq m < 5$ and $2 \leq y \leq 4$ (hereinafter, referred to as "Compound III").

Compound (III) is one whose basal skeleton is formed by entering a lithium ion into a vacant site of an aluminum hydroxide octahedron layer of the gibbsite structure and whose interlayers are intercalated with condensed silicate ions.

In case that an infrared absorber containing Compound (I) of the present invention is incorporated into a film such as an agricultural film, it is preferable to have very fine particle, a high dispersibility and relatively high crystallinity. Therefore, the average secondary particle size is preferably below 3 mμ, more preferably below 1 mμ. Also the BET specific surface area is preferably below 50 m²/g, more preferably below 20 m²/g.

In the infrared absorber of the present invention, relatively high molecular silicate ion is intercalated between the layers so that the layer spacing is greater than that of the corresponding carbonate where carbonate ion is intercalated between the layers. The lattice spacing at an index of place (002) measured by X-ray diffraction is 10 to 13 Å that is approximately 2 times of that of the corresponding carbonate.

And subsequently, it has characteristics that the refractive index values become small as being in the vicinity of 1.5, i.e. 1.48 to 1.50 which are those of resins in use so that it does not effect adversely on light transmittance. More specifically, for example, Compound (III) where the interlayers are intercalated with $Si_3O_7$ ion has a refractive index of 1.50 while basic lithium aluminum complex hydroxide carbonate has a refractive index of 1.55.

Also, the infrared absorber of the present invention contains condensed silicate ion having an absorption peak at the vicinity of 1000 cm⁻¹ in large amount (2 moles or more in terms of $SiO_2$), and subsequently its absorption peak at the vicinity of 1000 cm⁻¹ is markedly intensive. Especially one containing a divalent metal has a high content with respect to condensed siliciate ion so that its ability to absorb infrared rays become higher.

The product of the present invention is characterized by having infrared absorption peak based on condensed siliciate ion over the range of 850~1150 cm$^{-1}$. On the other hand, the carbonate type lithium aluminum hitherto known has only a slight absorption at 950~1100 cm$^{-1}$, and its ability to absorb infrared rays becomes little inevitably.

The following illustrates in details the process for preparing Compound (I) of the present invention where M$^{2+}$ is Mg as a specific example.

For example, the starting material carbonate ion type basic lithium magnesium and aluminum complex hydroxide salt which may be obtained by a process as after-mentioned is first reacted with halogen, nitric acid, sulfuric acid or monocarboxylic acid, thereby effecting the exchange reaction between the carbonate ion intercalated and an anion, and then the anion is exchanged with a condensed silicate ion, thereby obtaining Compound (I). In other words, Compound (I) may be prepared by subjecting a lithium magnesium and aluminum hyroxide complex salt containing, intercalated between the layers, one or more ions selected from halogen ion, nitric acid ion, sulfuric acid ion and monocarboxylic acid ion and condensed silicate ion to ion exchange reaction.

The followings illustrate processes for preparing Compound (I) specifically

Preparation A (First step)

First, a basic aluminum magnesium hydroxide complex salt (hereinafter, referred to as "co-precipitate") which may be employed as the starting material for preparing Compound (I) is prepared according to the following method.

That is, a water-soluble aluminum compound, a water-soluble magnesium compound and an alkali are reacted in an aqueous solution while a pH is maintained to about 8–10, thereby preparing a co-precipitate.

Examples of the above water-soluble aluminum compounds include sodium aluminate, aluminum sulfate, aluminum chloride, aluminum nitrate and aluminum acetate. Examples of water-soluble magnesium compounds include magnesium chloride, magnesium nitrate, magnesium sulfate and magnesium carbonate. Examples of alkali include hydroxide, bicarbonate and carbonate of alkali metals. Carbonates are preferred.

(Second step)

The co-precipitate obtained in the above reaction is washed with a suitable amount of water, and followed by addition of e.g. lithium carbonate or lithium hydroxide. The resultant mixture is subjected to heat treatment. Lithium carbonate or lithium hydroxide may be added so that molar ratio of Li/Al$_2$O$_3$ becomes 1-molar ratio of (MgO/Al$_2$O$_3$) with respect to the Al$_2$O$_3$ and MgO contents in the co-precipitate. The first and second steps as above-mentioned may be carried out continuously.

The temperature range for the heat treatment is preferably an appropriate temperature selected within the range of from an ordinary temperature to 160° C., more preferably from 90° C. to 140° C., most preferably from 110° C. to 140° C. When the treatment temperature is lower than the ordinary temperature, the degree of crystallization becomes low, and hence such a low temperature is not preferable.

Preparation B

Also, the carbonate type basic aluminum magnesium complex hydroxide may be prepared by the following method, which is used as the starting material for preparing a specific example of Compound (I) of the present invention wherein M$^{2+}$ is Mg.

Specifically, it may be prepared by subjecting aluminum hydroxide, lithium carbonate, magnesium carbonate or basic magnesium carbonate to heat treatment in an aqueous medium. Lithium carbonate, magnesium carbonate or basic magnesium carbonate may be added so that [molar ratio of Li/Al$_2$O$_3$]+[molar ratio of MgO/Al$_2$O$_3$] becomes 1 with respect to the Al$_2$O$_3$ content in aluminum hydroxide.

The temperature range for the heat treatment is preferably an appropriate temperature ranging from the ordinary temperature to 160° C., more preferably 90° C.~140° C., most preferably 110° C.~140° C. When the treatment temperature is lower than the ordinary temprature, the degree of crystallization becomes low, and hense such a low temperature is not preferable.

Preparation C

The above carbonate type basic lithium, magnesium and aluminum complex hydroxide is treated with acids, e.g. a halogenic acid such as hydrochloric acid, a mineral acid such as sulfuric acid or an organic acid e.g. monocarboxylic acid (monobasic organic acid) such as acetic acid, whereby the carbonate ion intercalated between the layers may be exchanged with an anion which is easily ion-exchangeable with a condensed silicate ion. By adequately selecting and combining raw materials, the anion containing-basic lithium magnesium and aluminum hydroxide complex salt obtained by the acid treatment, said anion being ion-exchangeable with a condensed silicate ion may be converted into basic lithium magnesium and aluminum hydroxide complex salt wherein the ion intercalated between the layers is halogen ion, nitric acid ion, sulfuric acid ion, or monocarblxylic acid ion without passing through the process for preparing the carbonate type lithium magnesium and aluminum hydroxide complex.

Next, the basic lithium magnesium and aluminum hydroxide complex salt having an anion intercalated between the layers is suspended in water and an alkali metal salt such as water glass (preferably No. 3 water glass) which is represented by the general formula Na$_2$O.nSiO$_2$ wherein n is 2~4 is added thereto thereby effecting reaction, and the desired Mg salt of Compound (I) with respect to M$^{2+}$ may be obtained by filtration and drying according to the conventional manner.

Compound (I) of the present invention is subjected to hydrothermal treatment using an autoclave, thereby its BET specific surface area and secondary particle diameter may be adjusted to an appropriate range. The temperature range for the hydrothermal treatment is preferably 100°~200° C., more preferably 110°~140° C.

The preparation of other divalent metal than Mg with respect to M$^{2+}$ may also be conducted in a similar manner as that of the Mg type and there is no particular care to be taken for it.

Compound (III), hydroxide complex with condensed silicate containing no divalent metal in the present invention may be prepared in a manner based on the process for preparing Compound (I) as before-mentioned. For example, there may be taken as first step (1) a process for treating the starting material carbonate ion type basic lithium aluminum hydroxide complex salt with an acid, or (2) a process for preparing a basic lithium aluminum hydroxide complex salt by appropriately selecting and combining raw materials, said basic lithium aluminum hydroxide complex salt being one wherein halogen ion, nitric acid ion, sulfuric acid ion or monocarboxylic acid ion is intercalated between the layers which is easily exchangeable with a condensed silicate ion.

With respect to the subsequent step, it may also be conducted by a manner based on the process for preparing the Compound (I) as before-mentioned. For example, a basic lithium aluminum complex hydroxide salt containing, intercalated beween the layers, one or more anions selected from halogen ion, nitric acid ion, sulfuric acid ion and monocarboxylic acid ion is reacted with condensed silicate ions whereby Compound (III) of condensed silicate ion type can be prepared.

The infrared absorber of the present invnetion is treated with a coating agent, thereby its dispersibility with a resin may be greatly improved.

Examples of coating agents include higher fatty acids, higher fatty acid salts, phosphoric esters of higher aliphatic alcohol, nonionic surfactants, cationic surfactants, amphoteric surfactants and coupling agents.

Examples of higher fatty acids include saturated or unsaturated fatty acid having 8 or more carbon atoms such as lauric acid, palmitic acid, oleic acid, stearic acid, capric acid, myristic acid and linoleic acid. Examples of higher fatty acid salts include alkali metal salts such as sodium, potassium salts of the above higher fatty acids. Examples of phosphoric esters of higher aliphatic alcohols include alkyl ether phosphoric acids such as lauryl ether phosphoric acid, stearyl ether phosphoric acid, oleyl ether phosphoric acid and the like; dialkyl ether phosphoric acid; alkyl phenyl ether phosphoric acid; dialkyl phenyl phosphoric acid; alkyl ether phosphoric acid salts such as sodium oleyl ether phosphate and potassium oleyl ether phosphate.

Examples of nonionic surfactants include alkylol amides such as coconut oil fatty acid monoethanolamide, lauric acid diethanolamide; polyoxyalkyl phenyl ethers such as polyoxyethylene alkyl phenyl ether and the like; polyoxyethylene alkyl ethers such as polyoxyethylene lauryl ether and the like; polyethylene glycol fatty acid esters such as distearic acid polyethylene glycol and the like; sorbitan fatty acid esters such as monocapric acid sorbitan, monostearic acid sorbitan, distearic sorbitan and the like; polyoxyethylene sorbitan fatty acid ester such as monostearic acid polyoxyethylene sorbitan; polyoxyethylene sorbit fatty acid ester, polyoxyethylene polyoxypropylene alkyl ethers, glycol ethers.

Examples of cationic surfactants include alkyl trimethyl ammonium salts such as lauryl trimethyl ammonium chloride, cetyl trimethyl ammonium bromide, stearyl trimethyl ammonium chloride and the like; alkyl dimethylbenzyl ammonium salts such as stearyl dimethylbenzyl ammonium chloride, benzalkonium chloride, lauryl dimethylbenzyl ammonium chloride and the like.

Examples of amphoteric surfactants include alkyl betaine such as coconut oil alkylbetaine and the like; alkylamide betaine such as lauryl dimethylamino acetic acid betaine; imidazoline such as Z-alkyl-N-carboxymethyl-N-hydroxyethylimidazolium betaine; glycines such as polyoctyl polyaminoethyl glycine and the like.

Examples of coupling agents include silane coupling agent, aluminum coupling agent, titanium coupling agent, zirconium coupling agent and the like.

One or more of the above coating agents may be used. The amount of the coating agent to be used may be 0.1 to 10% by weight, preferably 0.5 to 6% by weight based on the Compound (I). The amount less than 1% by weight gives bad dispersibility. On the other hand, when the amount exceeds 10% by weight the effect is sufficient, but is accompanied by economical disadvantage. The surface treatment by the coating agent may be easily conducted by either dry or wet method according to the conventional method.

Second feature of the present invention lies in an agricultural film wherein the above infrared absorber was incorporated and the process of its preparation. The agricultural film of the present invention may be prepared by the method as stated below.

First, a resin and the infrared absorber of the present invention are added in a mixer such as a ribbon blender, a Banbury mixer, a supermixer or a Henschel mixer and mixed, and thereafter melt-kneaded with an extruder, Banbury mixer or pressure kneader according to the conventional method.

The amount of the infrared absorber to be used may be preferably 1 to 50 parts by weight, more preferably 1 to 20 parts by weight based on 100 parts by weight of the resin. When it is less than 1 part by weight, the absorption of infrared rays is not sufficient. On the other hand, when it exceeds 50 parts by weight, light transmittance and mechanical strength required for an agricultural film are lowered.

Examples of the resin to be used include polyhalogenated vinyl such as polyvinyl chloride, polyvinylidene chloride; halogenated polyethylene, halogenated polypropylene, copolymers comprising combination of vinyl chloride-vinyl acetate, vinyl chloride-ethylene, vinyl chloride-propylene, vinyl chloride-styrene, vinyl chloride-isobutylene, vinyl chloride-vinylidene chloride, vinyl chloride-styrene-acrylonitrile, vinyl chloride-butadiene, vinyl chloride-propylene chloride, vinyl chloride-vinylidene chloride-vinyl acetate, vinyl chloride-maleic acid ester, vinyl chloride-methacrylic acid ester, vinyl chloride-acrylonitrile; polymers or copolymers of olefins such as ethylene, propyrene, butene-1, vinyl acetate and the like; polyethylenes such as L-LDPE, LDPE and the like; polypropyrene; ethylene-α-olefin copolymer such as ethylene-propylene copolymer, ethylene-butene -1 copolymer, ethylene-4-methyl-1-pentene copolymer, ethylene-hexene copolymer and the like; ethylene-vinyl acetate copolymer, ethylene-acrylic acid copolymer, ethylene-methyl methacrylate copolymer, ethylene-vinyl acetate-methyl methacrylate copolymer, ionomer resin and the like. Among these resins, polyethylene, ethylene-α-olefin copolymer, ethylene-vinyl acetate copolymer having less than 25% by weight of vinyl acetate content are preferred in considering the aspects of transparency, weathering resistance and price.

The resin composition prepared by mixing, melting and kneading operations may be shaped into a film according to the conventional method e.g. inflation, calendering or T-die extrusion. Thus, the agricultural film may be obtained.

The agricultural film of the present invention may have its one side or both sides provided with another resin layer, thereby obtaining a multilayer film. This multilayer film can be prepared by a lamination such as dry lamination or heat lamination or a coextrusion such as T-die coextrusion or inflation coextrusion.

For preparation of the agricultural film of the present invention, there may be added according to the necessity various kinds of the resin additives used conventionally such as a plasticizer, a lubricant, a light stabilizer, an antioxidant, an antistatic agent, a pigment, an ultraviolet absorber, an anti-fogging agent, an anti-haze agent, a thermal stabilizer, an anti-blocking agent, a dye, other heat insulating agent and the like. Examples of plasticizers include low molecule weight of polyhydric alcohol plasticizers such as glycerin, ethylene glycol, triethylene glycol, sorbitol and the like; phthalic ester plasticizers such as dioctyl phthalate (DOP), dimethyl phthalate and the like; phosphoric ester plasticizers, paraffin plasticizers, wax plasticizers and the like. Among these, polyhydric alcohols have anti-fogging action toward film, too.

Exampls of lubricants include fatty acids such as stearic acid, oleic acid, palmitic acid and the like; metal salts thereof; fatty acid amide derived from above fatty acids; waxes such as polyethylene wax and the like, liquid paraffin, ester such as glycerin fatty acid ester and higher alcohols.

Examples of light stabilizers include hindered amines, cresols, melamines, benzoic acid and the like.

Examples of hindered amine light stabilizers to be used include 2,2,6,6-tetramethyl-4-piperidylstearate, 1,2,2,6,6-pentamethyl-4-piperidyl-stearate, 2,2,6,6-tetramethyl-4-piperidinylbenzoate, N-(2,2,6,6-tetramethyl-4-piperidyl) dodecyl succinic acid imide, 1-(3,5-di-tert-butyl-4-hydroxyphenyl propionyloxyethyl)-2,2,6,6-tetramethyl-4-piperidyl-(3,5-di-tert-butyl-4-hydroxyphenyl)propionate, bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-butyl-2-(3,5-di-tert-butyl-4-hydroxybenzyl) maloate, N,N'-bis(2,2,6,6-tetramethyl-4-piperidyl) hexamethylene-diamine, tetra(1,2,2,6,6-pentamethyl-4-piperidinyl)butanetetracarboxylate, tetra(2,2,6,6-tetramethyl-4-piperidyl) butanetetracarboxylate, bis (1,2,2,6,6-pentamethyl-4-piperidyl) di(tridecyl)butanetetra-carboxylate, bis (2,2,6,6-tetramethyl-4-piperidyl-di (tridecyl)butanetetracarboxylate, 3,9-bis[1,1-dimethyl-2-[tris(2,2,6,6-tetramethyl-4-piperidyloxycarbonyloxy)butylcarbonyloxy]ethyl]-2,4,8,10-tetraoxaspiro[5,5] undecane, 3,9-bis[1,1-dimethyl-2-[tris(2,2,6,6-tetramethyl-4-piperidinyloxycarbonyloxy)butylcarbonyloxy]ethyl]-2,4,8,10-tetraoxaspiro[5,5]undecane, 1,5,8,12-tetrakis[4,6-bis[N -(2,2,6,6-tetramethyl-4-piperidyl)butylamino]-1,3,5-triazine-2-yl]-1,5,8,12-tetrazadodecane, 1-(2-hydroxyethyl) -2,2,6,6-tetramethyl-4-piperidinol/succinic acid dimethyl ester condensate, 2-tert-octylamino-4,6-dichloro-s-triazine/ N,N'-bis(2,2,6,6-tetramethyl-4-piperidyl) hexamethylenediamine condensate, N,N'-bis(2,2,6,6-tetramethyl-4-piperidyl)hexamethylene-diamine/dibromoethane condensate and the like.

It is suitable that the amount of light stabilizers to be incorporated is 0.02 to 5 parts by weight per 100 parts by weight of resins. The use of too small amount does not cause the effect, while the use of too large amount impairs the transparency of the film.

As antioxidants, phenol, phosphoric acid and sulfer containing ones may be taken.

Examples of phenolic antioxidants to be used include 2,6-di-tert-butyl-p-cresol, 2,6-diphenyl-4-octadecyloxy-phenol, stearyl(3,5-di-tert-butyl-4-hydroxyphenyl) propionate, distearyl (3,5-di-tert-butyl-4-hydroxybenzyl) phosphate, thiodiethylene glycol bis[(3,5-di-tert-butyl-4-hydroxyphenyl)propionate], 1,6-hexamethylene bis[(3,5-di-tert-butyl-4-hydroxyphenyl)propionate], 1,6-hexamethylene bis[(3,5-di-tert-butyl-4-hydroxyphenyl)propionamide], 4,4'-thiobis(6-tert-butyl-m-cresol), 2,2'-methylene bis (4-methyl-6-tert-butylphenol), 2,2'-methylene bis(4-ethyl-6-tert-butylphenol), bis[3,3-bis(4-hydroxy-3-tert-butylphenyl) butyric acid]glycol ester, 4,4'-butylidene bis(6-tert-butyl-m-cresol), 2,2'-ethylidene bis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1, 3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocynurate, tetrakis[methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-[(3-tert-butyl-4-hydroxy-5-methylphenyl) propionyloxy]ethyl]-2,4,8,10-tetraoxaspiro[5,5]undecane, triethyleneglycol bis[(3-tert-butyl-4-hydroxy-5-methylphenyl)propionate] and the like.

Examples of phosphoric acid antioxidants to be used include tris(nonylphenyl)phosphite, tris(2,4-di-tert-butylphenyl)phosphite, tris [2-tert-butyl-4-(3-tert-butyl-4-hydroxy-5-methylphenylthio)-5-methylphenyl]phosphite, tridecylphosphite, octyldiphenylphosphite, di(decyl) monophenylphosphite, monodecyldiphenylphosphite, mono (dinonylphenyl)bis(nonylphenyl)phosphite, di(tridecyl) pentaerythritoldiphosphite, distearylpentaerythritol diphosphite, di(nonylphenyl)pentaerythritoldiphosphite, bis (2,4-di-tert-butylphenyl)pentaerythritoldiphosphite, bis(2,6-di-tert-butyl-4-methylphenyl)pentaerythritol diphosphite, tetra(tridecyl)isopropylidene-diphenyl diphosphite, tetra ($c_{12-16}$ mixed alkyl)-4,4'-n-butylidene bis (2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphite, 2,2'-methylene bis(2,4-di-tert-butylphenyl) (octyl)phosphite and the like.

Examples of sulfur-containing antioxidants to be used include dialkyldithiopropionate such as dilauryl, dimyristyl or distearyl ester of thiodipropionic acid; β-alkylmercaptopropionic acid ester of polyol such as tetra (β-dodecylmercaptopropionate) of pentaerithrytol.

The above antioxidants may be preferably incorporated in an amount of about 0.01 to 3% by weight.

Examples of antistatic agents include polyoxyethylene alkylamine, polyglycol ether, nonionic active agent, cationic active agent and the like. As pigment, ones having high transmittance are preferred.

Examples of ultraviolet absorbers include benzophenones, benzotriazoles, salicylic acid esters, substituted oxanilides, cyanoacrylates and the like.

Examples of benzophenone ultraviolet absorbers to be taken include 2-hydroxybenzophenone compounds such as 2,4-dihydroxybenzophenone, 2-hydroxy-4-methoxybenzophenone, 2-hydroxy-4-octoxybenzophenone, 5,5'-methylene bis(2-hydroxy-4-methoxy)benzophenone and the like. Examples of benzotriazoles include 2-(2'-hydroxyphenyl)benzotriazole compounds such as 2-(2'-hydroxy-5'-methylphenyl) benzotriaozole, 2-(2'-hydroxy-3', 5'-di-tert-butylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl) benzotriazole, 2-(2'-hydroxy-3',5'-dicumylphenyl)benzotriazole, 2,2'-methylenebis(4-tert-octyl-6-benzotriazole)phenol and the like.

Examples of salicylic acid esters include phenylsalicylate, resorcinol monobenzoate, 2,4-di-tert-butyl phenyl-3',5'-di-tert-butyl-4'-hydroxybenzoate, hexadecyl-3,5-di-tert-butyl-4-hydroxybenzoate and the like.

Examples of substituted oxanilides include 2-ethyl-2'-ethoxyoxanilide, 2-ethoxy-4'-dodecyloxanilide and the like.

Examples of cyanoacrylates include ethyl-α-cyano-β,β-diphenylacrylate, methyl-2-cyano-3-methyl-3-(p-methoxyphenyl)acrylate and the like.

As anti-fogging agents, there may be preferably employed nonionic, anionic and cationic surfactants.

Concrete examples include sorbitan fatty acid esters such as sorbitan monostearate, sorbitan monopalmitate, sorbitan monobehenate and the like, glycerin fatty acid esters such as glycerin monolaurate, glycerin monostearate, glycerin monopalmitate, diglycerin dilaurate, diglycerin distearate, diglycerin monopalmitate, triglycerin monostearate and the like, polyhydric alcohol surfactants including polyethylene glycol active agents such as polyethylene glycol monostearate, their (polyhydric alcohol) alkylene oxide adducts, polyoxyalkylene ether, organic acid esters of sorbitans or glycerins.

As anti-haze agents, fluorine or silicone ones which have been conventionally used for agricultural film of polyolefin resins may be incorporated. It is preferable to use for example, low or high molecule compounds containing perfluoroalkyl or perfluoroalkenyl group which have at least 0.01% by weight of solubility in water and an ability to lower surface tension of water to below 35 dyn/cm preferably 30 dyn/cm at 25° C. Also, perfluoroalkyl group may be one containing an oxygen atom in the carbon chains.

Examples of fluorine surfactants include commercially available products "Unidyne DS-401", "Unidyne DS-403", "Unidyne DS-451" (Products of Daikin Industries Ltd.), "Megafac F-177" (product of Dainippon Ink & Chemicals Incorporated), "Florard FC-170", "Florard FC-176", "Florard FC-430" (products of Sumitomo 3M Ltd.), "Sarflone S-141", "Sarflone S-145", "Sarflone S-381", "Sarflone S-382", "Sarflone S-393" (products of Asahi Glass Co., Ltd.).

Examples of silicone anti-haze agents include polyether modified silicone oil, carboxy modified silicone oil and carbinol modified silicone oil. In general, ones are preferred which have at least 0.1% by weight of solubility in water and an ability to lower surface tension of water to below 35 dyn/cm at 25° C. Examples of commercially available silicone surfactants include "KF-354" (a product of Shin-Etsu Chemical Co., Ltd.), "SH-3746" (a product of Dow Corning Toray Silicone Co., Ltd.), "TSF-4445" (a product of Toshiba Silicone Co., Ltd.). The anti-haze agents may be preferably incorporated in an amount of about 0.02 to 5 part by weight per 100 perts by weight of resins.

As thermal stabilizers, especially tin stabilizers, lead stabilizers, metal complex fatty acid stabilizers such as calcium-zinc, barium-zinc which are incorporated in polyvinyl chloride resins may be used.

Also, other heat insulation agents, magnesium carbonate, magnesium silicate, silicon dioxide, aluminum oxide, barium sulfate, magnesium hydroxide, aluminum hydroxide, phosphate, silicate, hydrotalcite may be employed to such extent that they do not impair the transparency of film.

One or more of the above various additives may be properly selected for incorporation. The amount of the additives to be incorporated is not particularly limited so long as it causes no deterioration in the property of the film.

The agricultural film obtained thus which contains the product of the present invention has a high infrared ray absorptivity and consequently it exhibits excellent heat insulation effect. For example, in case that the infrared absorber of the present invention is incorporated into LDPE resin in an amount of 10 part by weight or more based on LDPE resin and the mixture is formed into a film, the film holds a heat insulation efficiency index of 50 or more, indicating that the amount incorporated of the infrared absorber of the present invention may be reduced to one half in comparison with that of a carbonate type of lithium aluminum complex hydroxide in order to hold the equal level of heat insulation efficiency each other.

BEST MODES FOR CARRYING OUT THE INVENTION

The following Examples, Comparative Examples and Exprimental Examples illustrate the present invention more specifically.

The BET specific surface area can be measured from the amount adsorped of nitrogen according to the conventional method. The average secondary particle size can be determined by a method which comprises adding sample powder to an organic solvent such as ethanol or n-hexane, dispersing by ultrasonic, dropping the dispersion on a sample mount for a microscope, drying it and effecting a microscopic observation. An electron microscope and an optical microscope can be used as the microscope.

EXAMPLE 1

Water was added to a mixture of 214.0 g of powdery aluminum hydroxide containing 65% by weight in terms of $Al_2O_3$, 13.9 g magnesium chloride containing 19.8% by weight in terms of MgO and 61.1 g of lithium carbonate to make 3 l of slurry in total volume. The slurry was subjected to heat treatment in 5 l of an autoclave at 150° C. for 4 hours. After the heat treatment, to the slurry cooled to 25° C. was added 5% by weight of nitric acid (molar ratio of $HNO_3/Al_2O_3=1.5$) thereby effecting acid treatment. And then, 4 liters of aqueous solution containing 424.1 g sodium silicate (No. 3 water glass, 29% by weight in terms of $SiO_2$) was added and agitated for 60 minutes. While the temperature of the slurry was kept to 50° C., 11.5 g sodium stearate was added to carry out surface-treatment. Thereafter, the resultant slurry was dried to form a cake under reduced pressure with a Buchner funnel, and the cake was washed with a quantity of water equivalent to about 50 times of the $Al_2O_3$ content in weight. After washing, the cake was dried overnight at about 110° C. to obtain 400 g of white powder.

The obtained white powder was subjected to chemical analysis and it was determined that it had the following composition:

$$[Al_2(Li_{0.90}Mg_{0.10})(OH)_6]_2(Si_3O_7)_{1.10} \cdot 3.0H_2O$$

It had a BET speific surface area of 15.7 m²/g an average particle size of 0.9 μm and a refractive index of 1.498.

Figure 1:
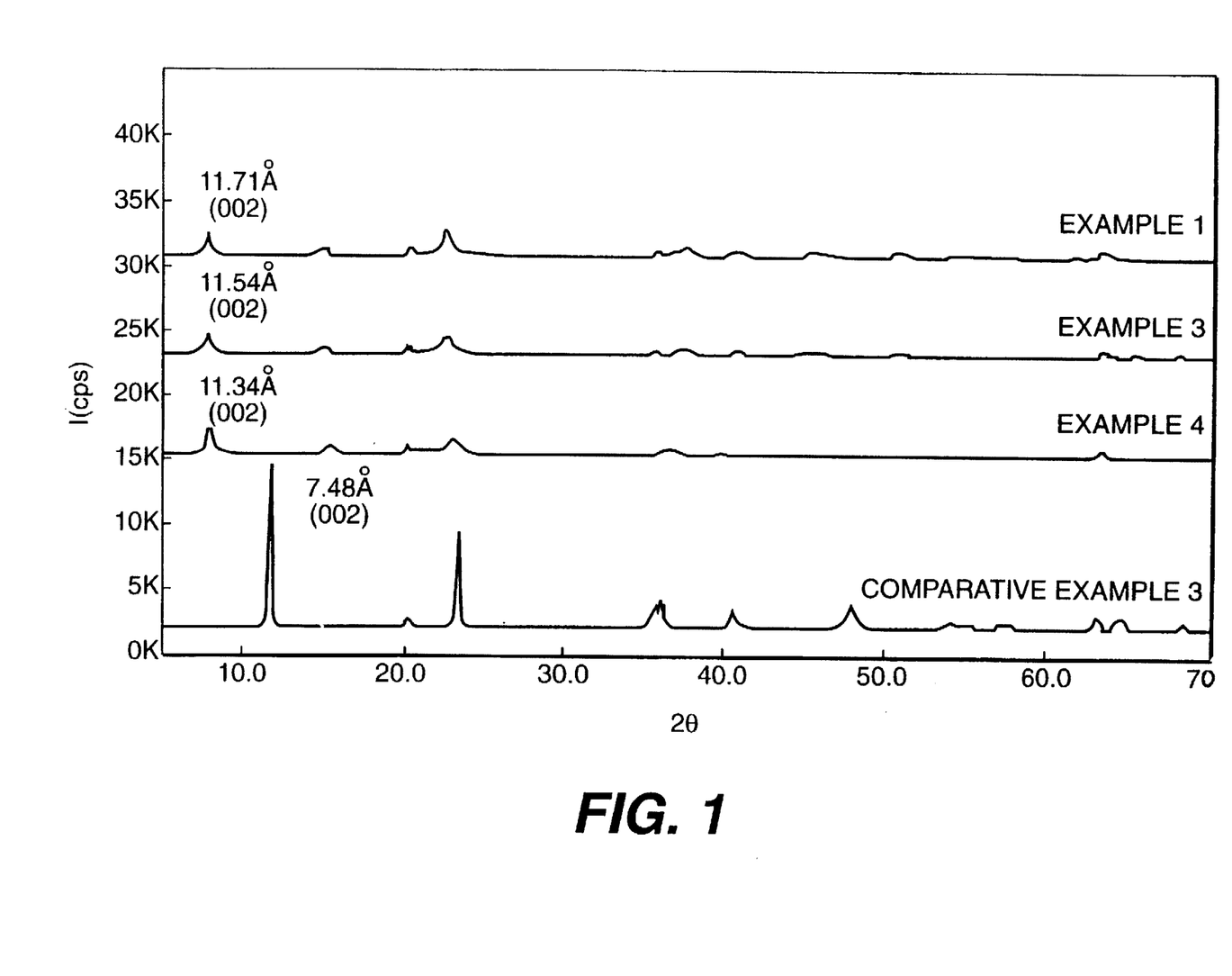
[FIG. 1] is X-ray diffraction patterns of the respective powders obtained in Examples 1, 3 and 4 and Comparative Example 3.
Figure 2:
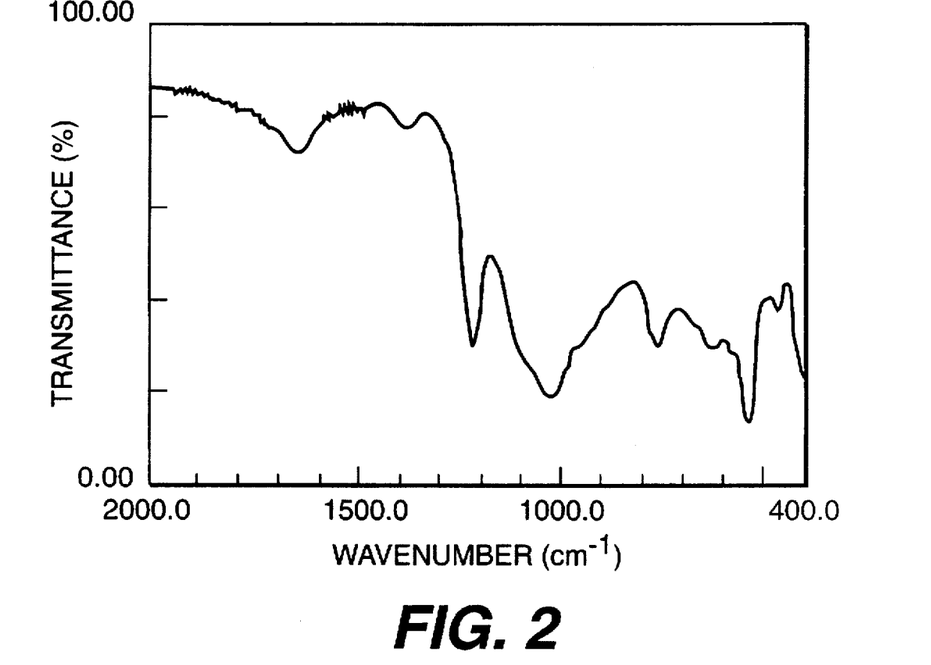
[FIG. 2] is an infrared absorption spectrum of the powder obtained in Example 1.

The X-ray diffraction pattern of the powder is shown in FIG. 1. The spacing at an index of plane (002) was 11.71 Å. Also, the infrared absorption spectrum is shown in FIG. 2.

The white powder was dried at 200° C. for 3 hours, and the resultant dried one containing 0.3 mole of water (3 hours-burned product) was subjected to the agricultural film-preparation test as after-mentioned.

EXAMPLE 2

Water was added to a mixed aqueous solution of 1638 g of aqueous luminum sulfate solution containing 7.12% by weight in terms of $Al_2O_3$ and 116.4 g of aqueous magnesium chloride solution containing 19.8% by weight in terms of MgO to make 3 l of solution, which is designated as Solution A. Contrary thereto, water was added to a mixed aqueous solution of 465.1 g of aqueous solution containing 99.5% by weight of sodium carbonate and 462.3 g of aqueous sodium aluminate solution containing 18.69% by weight in terms of $Al_2O_3$ to make 10 l of solution, which is designated as Solution B.

Next, 1 l of water was added to 2.5 l of a reaction vessel equipped with an overflow recovery function. While being sufficiently agitated with a stirrer, Solution A and Solution B were fed into the vessel through quantitative pumps at a rate of 123.5 ml/min. and 370.5 ml/min, respectively to synthesize magnesium and aluminum hydroxide complex salt. The pH during the reaction was approximately 9.

Three liters of the reaction solution overflowed from the vessel during the reaction was dehydrated to form a cake under reduced pressure with a Buchner funnel, and the cake was washed with a quantity of water equivatent to 150 times of the $Al_2O_3$ content in weight. After washing, water was added to the cake to make 3 l of homogeneous slurry.

Thereafter, 11.79 g of lithium carbonate was added to the above slurry, and the resultant slurry was subjected to heat treatment at 150° C. for 4 hours in 5 l of an autoclave. After the heat treatment, the temperature of the slurry was cooled to 25° C. and 5% by weight of nitric acid (molar ratio of $HNO_3/Al_2O_3=1.5$) was added thereto for acid treatment. And then, 6 l of aqueous solution containing 518.1 g of sodium silicate (No. 3 water glass, 29% as SiO2) was added and agitated for 60 min. While the temperature of the slurry was kept to 50° C., 11.5 g of sodium stearate was added for surface-treatment. The slurry after the surface-treatment was dried to form a cake under reduced pressure using a Buchner funnel, and the cake was washed with a quantity of water equivalent to about 50 times of the $Al_2O_3$ content in weight. After washing, the cake was dried overnight at approximately 110° C. to obtain 530 g of white powder.

The obtained white powder was subjected to chemical analysis, and it was determined that it had the following composition:

$$[Al_2(Li_{0.75}Mg_{0.25})(OH)_6]_2(Si_3O_7)_{1.25} \cdot 3.0_2O$$

It had a BET specific surface area of 35.7 m²/g, an average particle size of 0.45 μm and a refractive index of 1.485.

This white powder was dried at 200° C. for 3 hours and the resultant dried one containing 0.3 mole of water (3 hours-burned product) was subjected to the agricultural film-preparing test as after-mentioned.

EXAMPLE 3

Water was added to a mixture of 214.0 g of powdery aluminum hydroxide containing 65% by weight in terms of $Al_2O_3$ and 61.1 g of lithium carbonate to make 3 l of slurry.

This slurry was subjected to heat treatment at 150° C. for 4 hours in 5 l of an autoclave. After the heat treatment, to the slurry cooled to 25° C. was added 5% by weight of nitric acid (molar ratio of $HNO_3/Al_2O_3=1.5$) for acid treatment. Thereafter, 4 l of aqueous solution containing 424.1 g of sodium silicate (No. 3 water glass, 29% as $SiO_2$) was added and agitated for 60 minutes. While the temperature of the slurry was kept to 50° C., 11.5 g of stearyl ether phosphoric acid was added for surface-treatment. And then, this slurry was dried to form a cake under reduced pressure with a Buchner funnel, and the cake was washed with a quantity of water equivalent to about 50 times of the $Al_2O_3$ content in weight. After washing, the cake was dried overnight at about 110° C. to obtain 400 g of white powder.

The obtained white powder was subjected to chemical analysis, and it was determined that it had the following composition:

$$[Al_2Li(OH)_6]_2(Si_3O_7)_1 \cdot 3.0H_2O$$

It had a BET specific surface area of 15.7 m²/g, an average particle size of 0.9 μm and a refractive index of 1.502.

Figure 3:
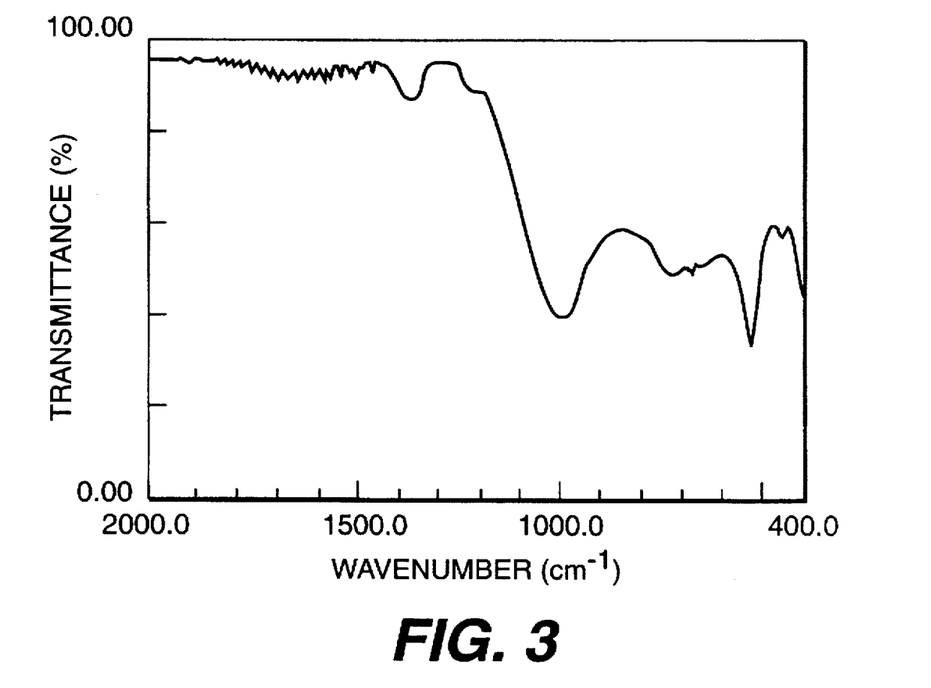
[FIG. 3] is an infrared absorption spectrum of the powder obtained in Example 3.

The X-ray diffraction patern of the obtained powder is shown in FIG. 1. The spacing at an index of plane (002) was 11.54 Å. Also, the infrared absorption spectrum is shown in FIG. 3.

This white powder was dried at 200° C. for 3 hours, and the dried one (3 hours-burned product) wherein the water content was 0.3 mole was subjected to the agricultural film-preparing test as after-mentioned.

EXAMPLE 4

Water was added to a mixture of 214.0 g of powdery aluminum hydroxide containing 65% by weight in terms of $Al_2O_3$ and 61.1 g of lithium carbonate to make 3 l of slurry.

This slurry was subjected to heat treatment at 150° C. for 4 hours in 5 l of an autoclave. After the heat treatment, to the slurry cooled to 25° C. was added 5% by weight of nitric acid (molar ratio of $HNO_3/Al_2O_3=1.5$) for acid treatment. Thereafter, 4 l of aqueous solution containing 284.7 g of sodium silicate (No. 3 water glass, 29 % as $SiO_2$) was added and agitated for 60 min. While the temperature of the slurry was kept to 50° C., 11.5 g of stearyl ether phosphoric acid was added for acid treatment. And then, this slurry was dried to form a cake under reduced pressure with a Buchner funnel, and the cake was washed with a quantity of water equivalent to about 50 times of the $Al_2O_3$ content in weight. After washing, the cake was dried overnight at about 110° C. to obtain 380 g of white powder.

The obtained white powder was subjected to chemical analysis, and it was determined that it had the following composition:

$$[Al_2Li(OH)_6]_2(Si_2O_5)_1 \cdot 3.0H_2O$$

It had a BET specific surface area of 8.7 m²/g, an average particle size of 0.9 μm and a refractive index of 1.508.

The X-ray diffraction pattern of this white powder is shown in FIG. 1. The spacing at an index of plane (002) was 11.34 Å.

This white powder was dried at 200° C. for 3 hours, and the dried one (3 hours-burned product) wherein the water content was 0.3 mole was subjected to the agricultural film-preparing test as after-mentioned.

EXAMPLE 5

Water was added to a mixed solution of 1638 g of aqueous aluminum sulfate containing 7.12% by weight in terms of $Al_2O_3$ and 116.4 g of aqueous magnesium chloride solution containing 19.8% by weight in terms of MgO to make 3 l of solution which is designated as Solution C. Contrary thereto, water was added to a mixed aqueous solution of 465.1 g of 99.5% by weight of sodium carbonate solution and 462.3 g of aqueous sodium aluminate solution containing 18.69% by weight in terms of $Al_2O_3$ to make 10 l of solution which is designated as Solution D.

Next, 1 l of water was added to 2.5 l of a reaction vessel equipped with a overflow recovery function. While agitation was sufficiently operated with a stirrer, Solution C and Solution D were fed respectively thereto at a rate of 123.5 ml/min., 370.5 ml/min. using quantitative pumps to synthesize magnesium and aluminum complex hydroxide. The pH during the reaction was approximately 9.

Three liters of the reaction solution which was overflowed from the reaction vessel was dehydrated to form a cake under reduced pressure using a Buchner funnel, and the cake was washed with a quantity of water equivalent to 150 times of the $Al_2O_3$ content in weight. After washing, water was added to the cake to make 3 l of homogeneous slurry. 11.79 Grams of lithium carbonate was then added to the above slurry and the mixture was subjected to heat treatment at 140° C. for 16 hours in 5 l of an autoclave. After the heat teratment, while the slurry temperature was kept to 90° C., 7.20 g of sodium stearate was added for surface-treatment. Thereafter, the surface-treated product was treated with 5% by weight of nitric acid (molar ratio of $HNO_3/Al_2O_3=1.5$), and followed by addition 6 l of aqueous solution containing 518.1 g of sodium silicate (29.0% in terms of $SiO_2$) and by agitating for 60 min. The slurry was dehydrated to form a cake under reduced pressure with a Buchner funnel, and the cake was washed with a quantity of water equivalent to 40 times of the $Al_2O_3$ content in weight. After washing, the cake was dried overnight at about 110° C. to obtaine 530 g of white powder.

The obtained white powder was subjected to chemical analyss, and it was determined that it had the following composition:

$[Al_2(Li_{0.75}Mg_{0.25})(OH)_6]_2(Si_2O_5)_{1.25} \cdot 2.0H_2O$

Figure 4:
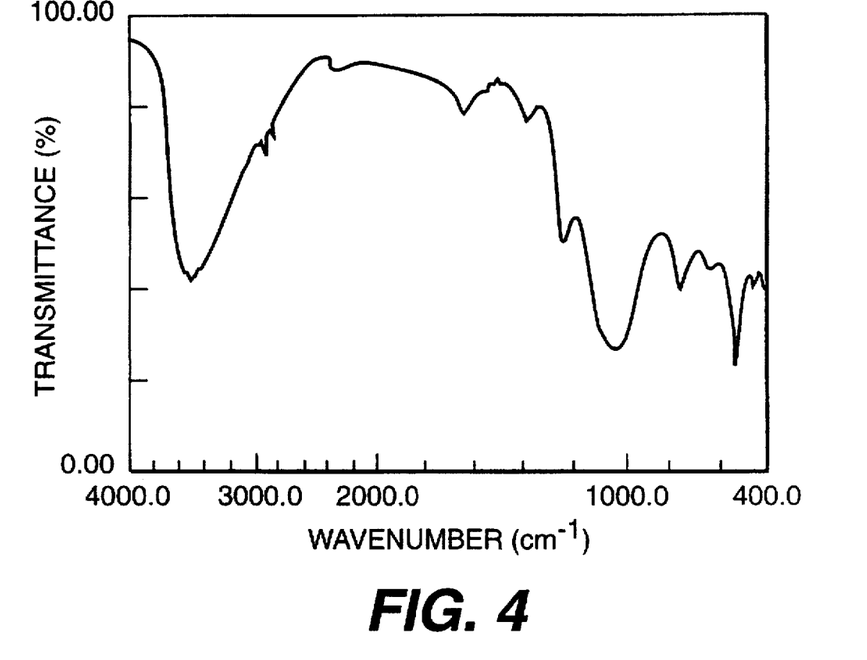
[FIG. 4] is an infrared absorption spectrum of the powder obtained in Example 5.

It had a BET specific surface area of 38.0 m²/g and an average particle size of 0.45 μm. Also, the infrared absorption spectrum is shown in FIG. 4.

EXAMPLE 6

Water was added to 1638 g of aqueous aluminum sulfate solution containing 7.12% by weight in terms of $Al_2O_3$ to make 3 l of solution, which is designated as Solution E. Contrary thereto, water was added to a mixed aqueous solution of 467.0 of aqueous solution containing 99.5% by weight of sodium carbonate and 462.3 g of aqueous sodium aluminate solution conatining 18.69% by weight in terms of $Al_2O_3$ to make 10 l of solution, which is designated as Solution F.

One liter of water was then added to a 2.5 l reaction vessel equipped with an overflow recovery function. While being sufficiently agitated with a stirrer, Solution E and Solution F were fed into the vessel through quantitative pumps at a rate of 123.5 ml/min. and 370.5 ml/min, respectively. The pH during the reaction was approximately 9. Three liters of the reaction solution overflowed from the vessel during the reaction was dehydrated to form a cake under reduced pressure using a Buchner funnel. The cake was washed with a quantity of water equivalent to 150 times of the $Al_2O_3$ content in weight. After washing, water was added to the cake to make 3 l of homogeneous slurry.

To the slurry was added 12.76 g of lithium carbonate, and the mixture was subjected to heat treatment at 110° C. for 16 hours in 5 l of an autoclave. After the heat treatment, while the slurry temperature was kept to 90° C., 7.20 g of sodium stearate was added for surface-treatment. Thereafter, the surface-treated product was treated with 5% by weight of nitric acid (molar ratio of $HNO_3/Al_2O_3=1.5$) and followed by addition of 6 l of aqueous solution containing 414.5 g of sodium silicate (29.0% in terms of $SiO_2$) and agitation for 60 min. The resultant slurry was dehydrated to form a cake under reduced pressure with a Buchner funnel, and the cake was washed with a quantity of water equivalent to 40 times of the $Al_2O_3$ content in weight. After washing, the cake was dried overnight at about 110° C. to obtain 490 g of white powder.

The obtained white powder was subjected to chemical analysis, and it was determined that it had the following composition:

$[Al_2(Li_{1.00})(OH)_6]_2(Si_2O_5)_{0.98} \cdot 2.0H_2O$

Figure 5:
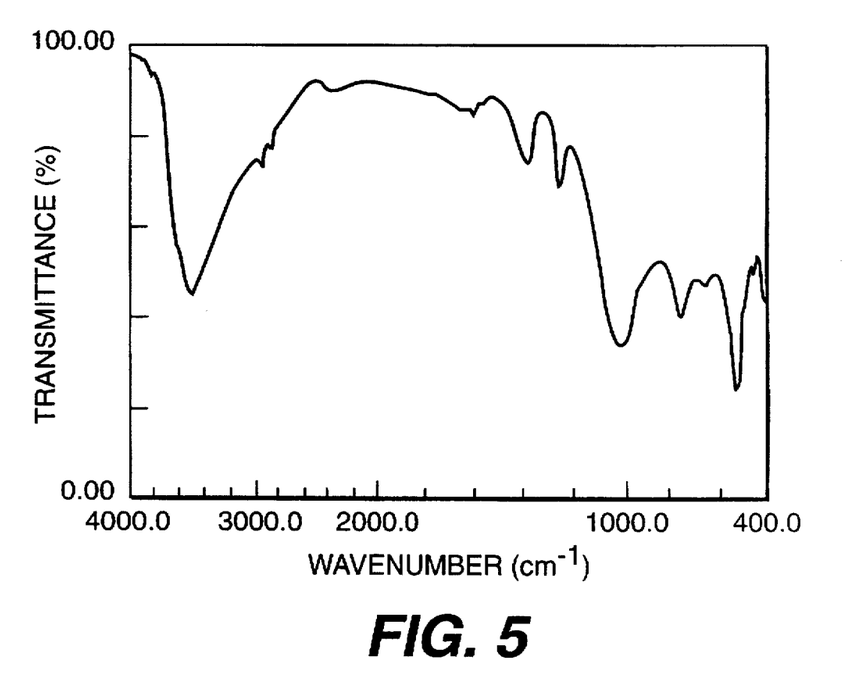
[FIG. 5] is an infrared absorption spectrum of the powder obtained in Example 6.

It had a BET specific surface area of 31.5 m²/g and an average particle diameter of 0.40 μm. Also, the infrared absorption spectrum is shown in FIG. 5.

EXAMPLE 7

Aluminum lithium magnesium hydroxide complex with condenced silicate (3-hours burned product) obtained in Example 1 was used as an infrared absorber for agricultural film, and the effectiveness was confirmed.

10 Parts by weight of the hydroxide complex with condensed silicate obtained in Example 1 was added to 100 parts by weight LDPE resin, and the mixture was formed into pellets at about 200° C. using a double-screw extruder. The pellets was extruded through T-die into a film of 200 μm in thickness for agricultural use. The transparency and heat insulating effect of this agricultural film were measured. The heat insulating property was evaluated by measuring the infrared absorptivity. The infrared absorptivities of the obtained film were measured at infrared wavelengths ranging from 2000 cm⁻¹ (5 μm) to 400 cm⁻¹ (25 μm), and each measurement obtained every 20 cm⁻¹ was multiplied by the relative radiation evergy of the black body to thereby obtain products whose average was evaluated as a heat insulation efficiency. The greater the heat insulation efficiency, the greater the heat insulating effect.

Figure 6:
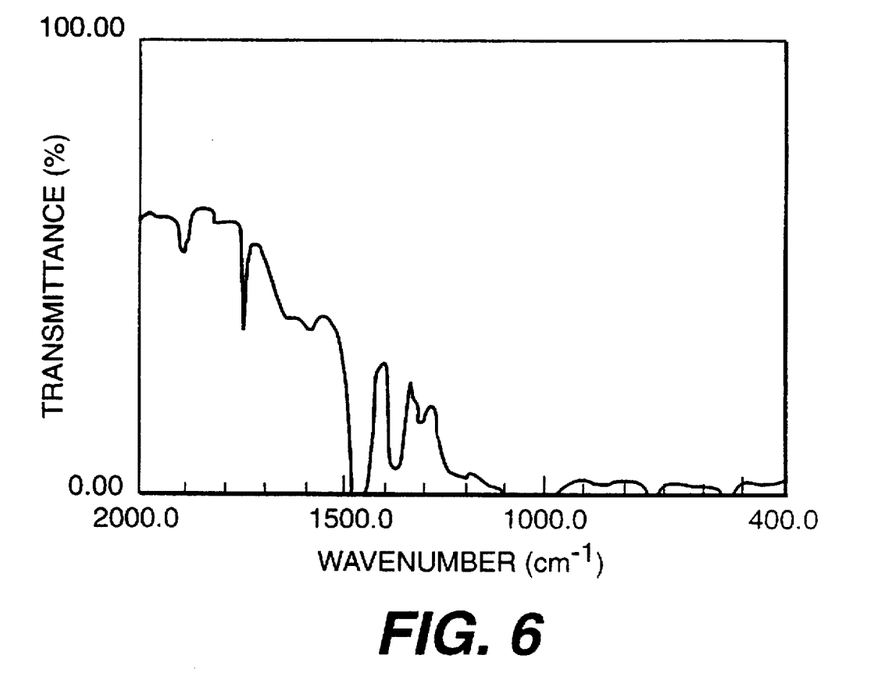
[FIG. 6] is an infrared absorption spectrum of the film of Example 7.

The transparency was evaluated in transmittance percent to the total light of 700–400 nm which was measured using a spectrophotometer (a product of Japan Spectroscopic Co. Ltd.) The infrared absorption spectrum is shown in FIG. 6.

EXAMPLE 8

Figure 7:
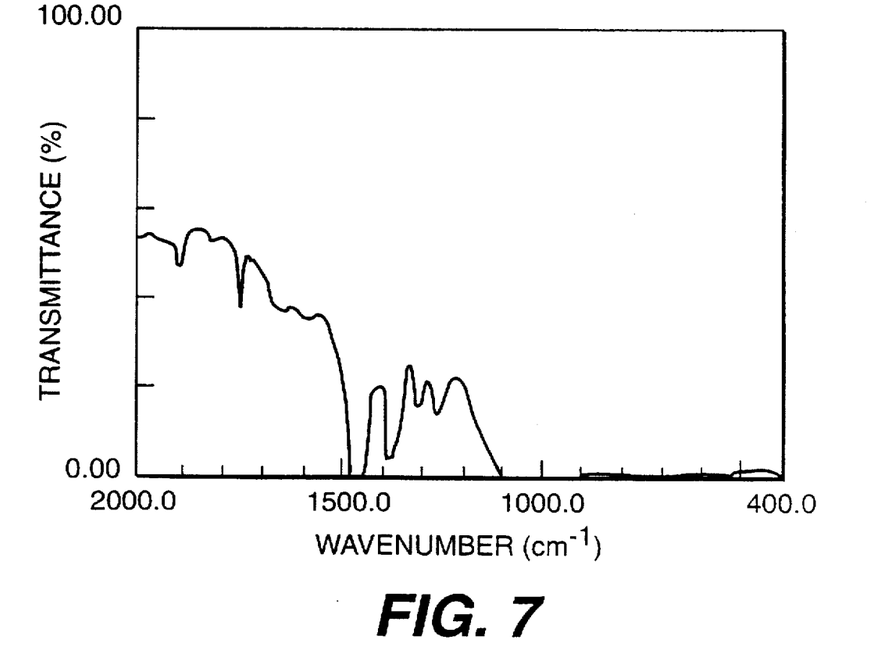
[FIG. 7] is an infrared absorption spectrum of the film of Example 8.

An agricultural film was prepared using 10 parts by weight of aluminum lithium and magnesium hydroxide complex with condensed silicate (infrared absorber) (three hours-burned product) obtained in Example 2 in the similar manner as in Example 7, and its transparency and heat insulation property were evaluated. The infrared absorption spectrum is shown in FIG. 7.

EXAMPLE 9

Figure 8:
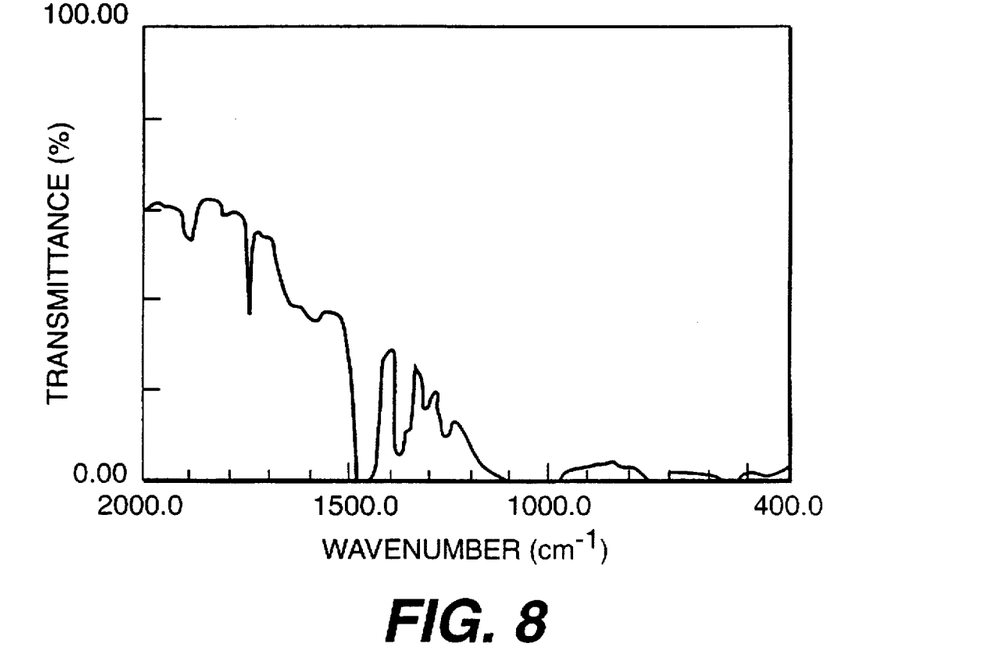
[FIG. 8] is an infrared absorption spectrum of the film of Example 9.

An agricultural film was prepared using 10 parts by weight of aluminum lithium hydroxide complex with condensed silicate (3 hours-burned product) obtained in Example 3 as an infrared absorber in the similar manner as in Example 7 to evaluate its transparency and heat insulation property. The infrared absorption spectrum is shown in FIG. 8.

EXAMPLE 10

Figure 9:
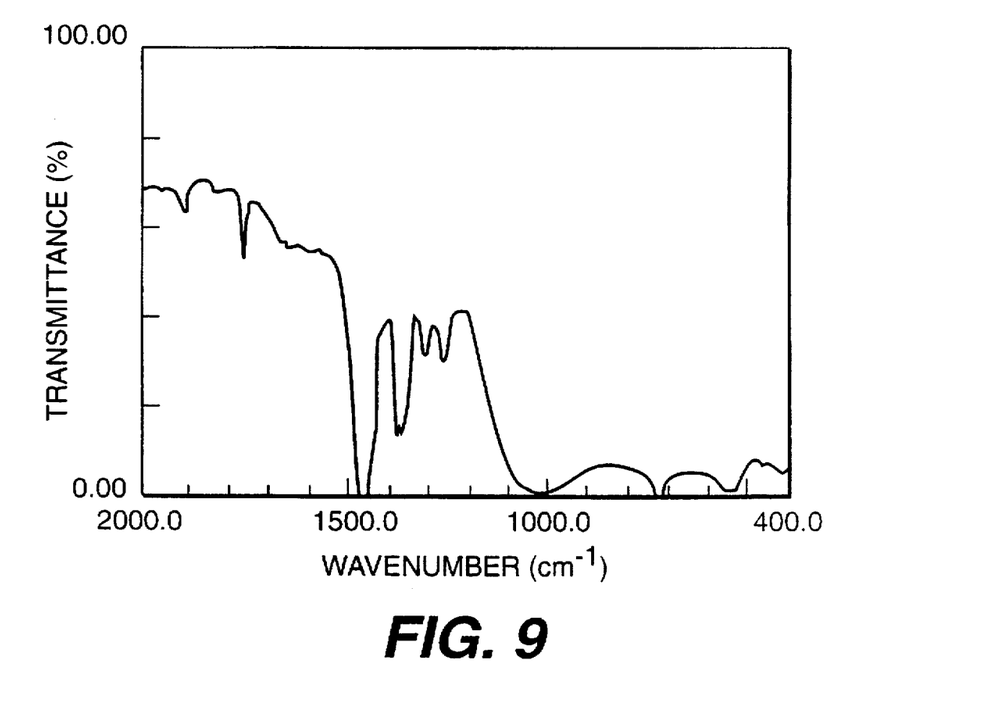
[FIG. 9] is an infrared absorption spectrum of the film of Example 10.

An agricultural film was prepared using 10 parts by weight ofsluminum lithium hydroxide complex with condensed silicate (3 hours-burned product) obtained in Example 4 as an infrared absorber in the similar manner as in Example 7 to evaluate its transparency and heat insulation property. The infrared absorption spectrum is shown in FIG. 9.

EXAMPLE 11

Figure 10:
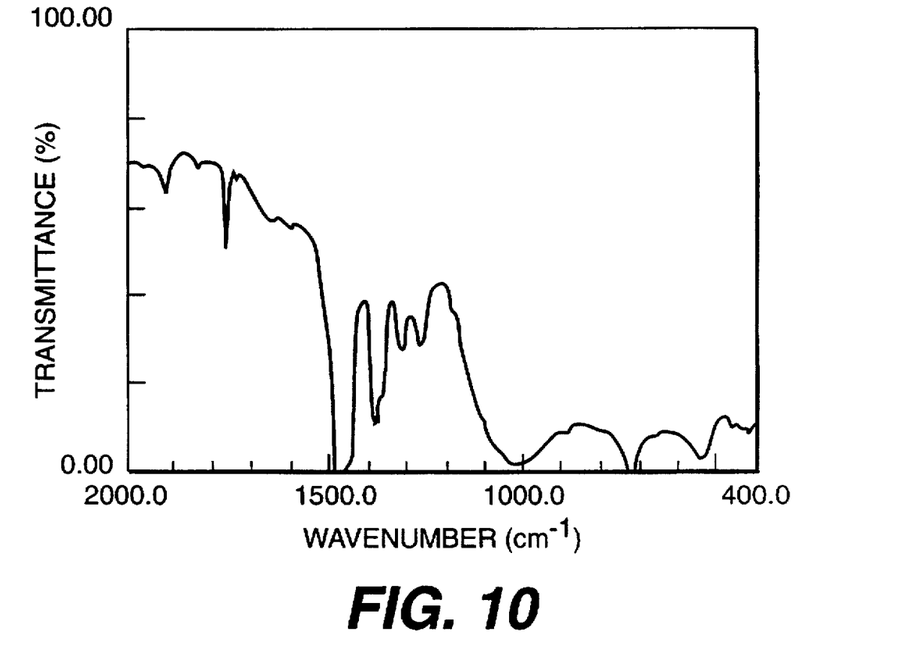
[FIG. 10] is an infrared absorption spectrum of the film of Example 11.

An agricultural film was prepared using 5 parts by weight of aluminum lithium hydroxide complex with condensed silicate (3 hours-burned product) obtained in Example 3 as an infrared absorber in the similar manner as in Example 7 to evaluate its transparency and heat insulation property. The infrared absorption spectrum is shown in FIG. 10.

EXAMPLE 12

Figure 11:
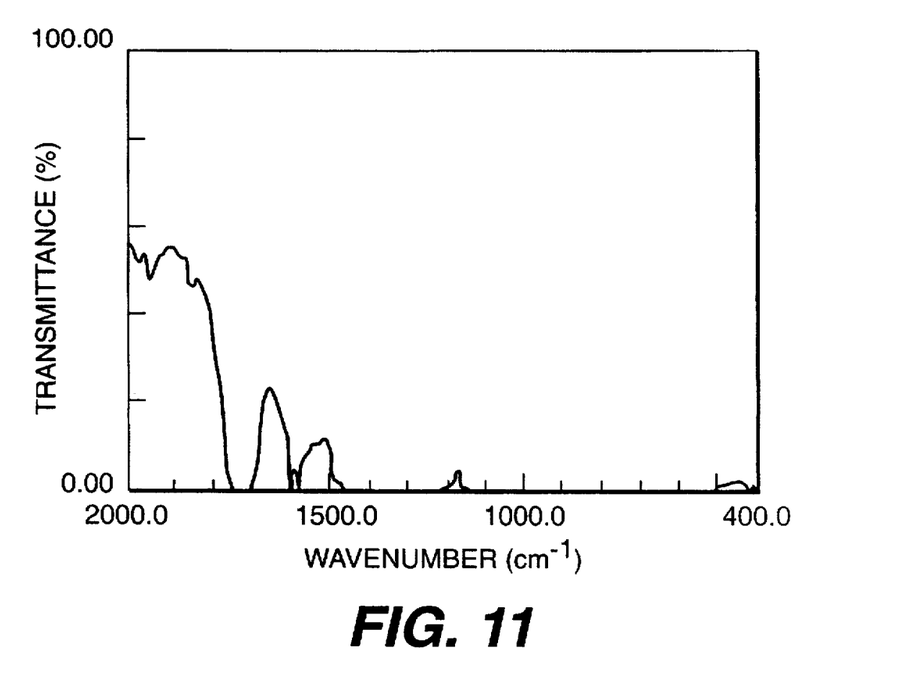
[FIG. 11] is an infrared absorption spectrum of the film of Example 12.

A mixture of 100 parts by weight of polyvinyl chloride (a degree of polymarization of 1300), 0.2 part by weight of zinc stearate, 0.2 part by weight of dibenzoylmethane, 10 parts by weight of aluminum lithium hydroxide complex with condensed silicate (3 hours-burned product) obtained in Example 3 and 50 parts by weight of DOP was kneaded by a roll mill and pressed to form a film of 200 µm in thickness which was used as an agricultural film. The transparency and the heat insulation property were evaluated. The infrared absorption spectrum is shown in FIG. 11.

COMPARATIVE EXAMPLE 1

Figure 12:
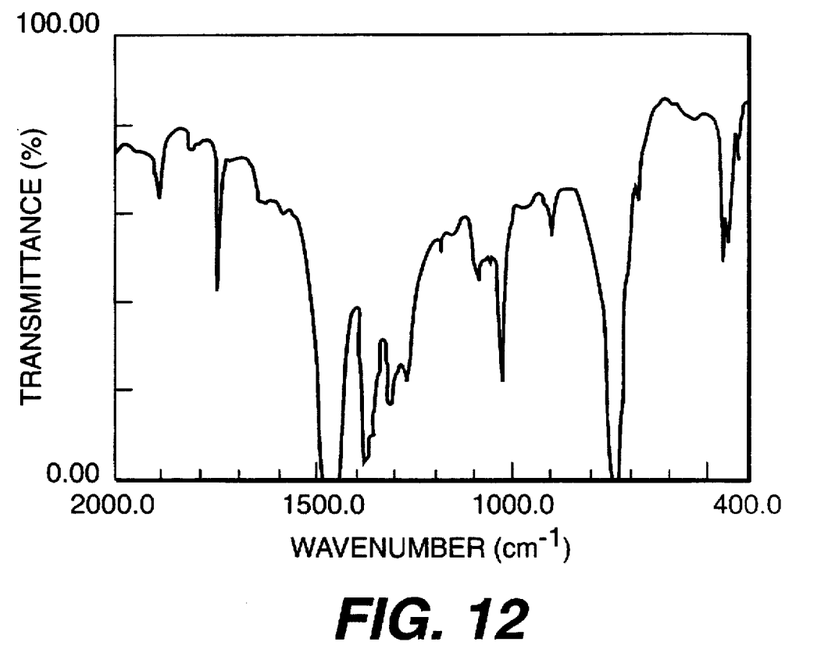
[FIG. 12] is an infrared absorption spectrum of the film of Comparative Example 1.

A film of LDPE was prepared in the similar manner as in Example 3 except that the addition of the infrared absorber of the present invention was omitted. Its heat insulation property and transparency were evaluated. The infrared absorption spectrum is shown in FIG. 12.

COMPARATIVE EXAMPLE 2

Figure 13:
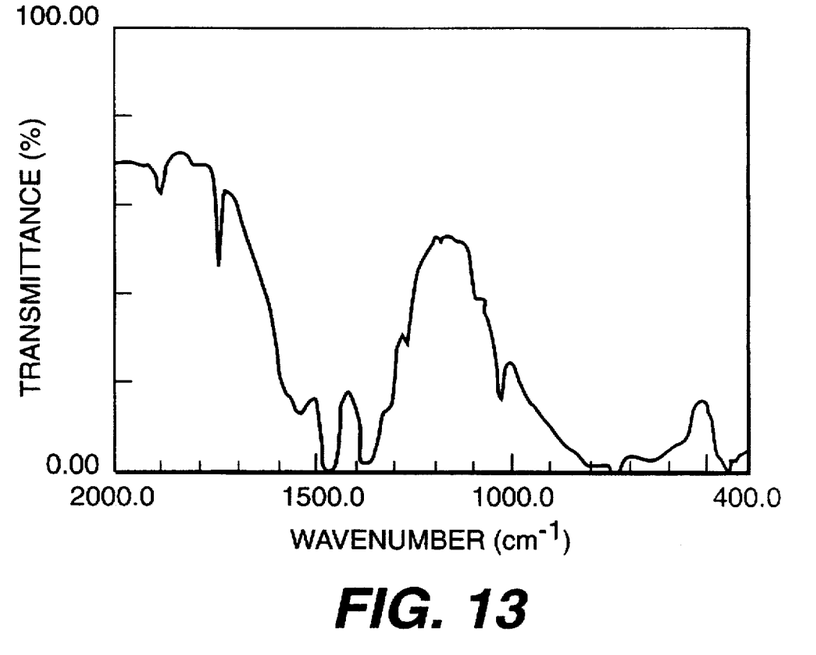
[FIG. 13] is an infrared absorption spectrum of the film of Comparative Example 2.

An agricultural film was prepared in the similar manner as in Example 3 except that 10 parts by weight of "DHT-4A" (a trade name, an infrared absorber manufactured by Kyowa Chemical Industry Co., Ltd.) was used in place of the infrared absorber of the present ivnention, and its heat insulation property and transparency were evaluated. The infrared absorption spectrum is FIG. 13.

COMPARATIVE EXAMPLE 3

Water was added to a mixture of 214 g of powdery aluminum hydroxide containing 65% by weight in terms of $Al_2O_3$, 13.9 g of magnesium chloride containing 19.8% by weight in terms of MgO and 61.1 g of lithium carbonate to make 3 liters (l) of slurry.

The slurry was subjected to heat treatment at 150° C. for 4 hours in 5 l of an autoclave, and then while the temperature was kept to 50 l, 11.5 g of stearyl ether phosphoric acid was added thereto for surface-treatment.

Thereafter, the slurry was dried to form a cake under reduced pressure with a Buchner funnel, and the cake was washed with a quantity of water equivalent to about 50 times of the $Al_2O_3$ content in weight. After washing, the cake was dried overnight at about 110° C. to obtain white powder.

The obtained white powder was subjected to chemical analysis, and it was determined that it had the following composition:

$[Al_2Li(OH)_6]_2(CO_3)_1 \cdot 3.0\ H_2O$

It had a BET specific surface area of 13.7 m²/g, an average particle size of 0.9 µm and a refrative index of 1.50.

Figure 14:
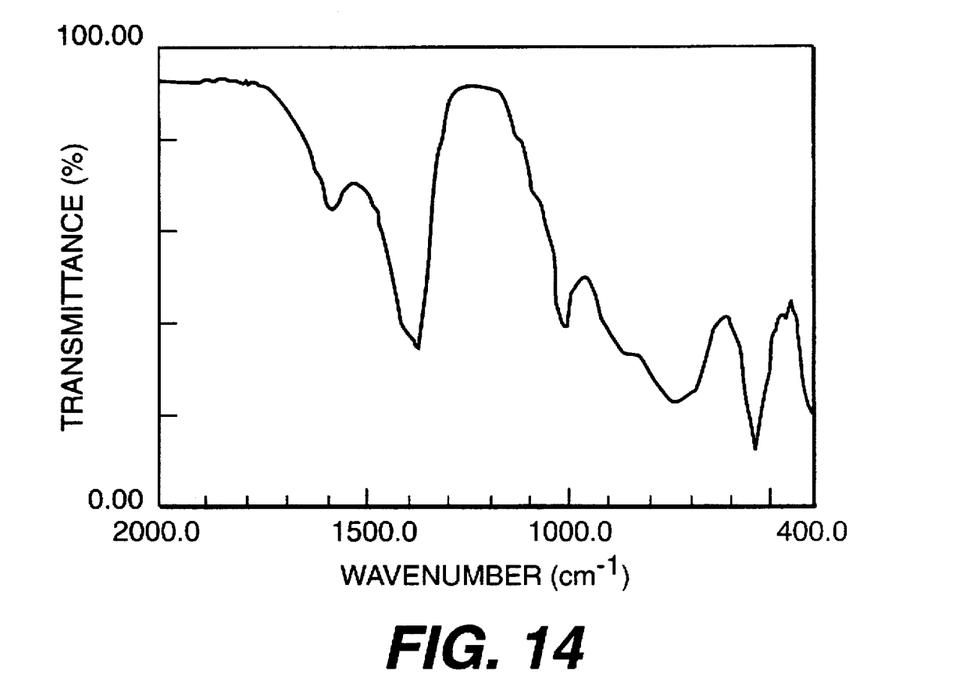
[FIG. 14] is an infrared absorption spectrum of the powder obtained in Comparative Example 3.

The X-ray diffraction pattern of the the obtained powder is shown in FIG. 1. The lattice spacing at a indix of plane (002) was 7.84 Å. Also, the infrared absorption spectrum is shown in FIG. 14.

The white powder was dried at 200° C. for 3 hours, and the resultant dried one containing 0.3 mole of water (3 hours-burned product) was subjected to the agricultural film-preparing test as after-mentioned.

COMPARATIVE EXAMPLE 4

Figure 15:
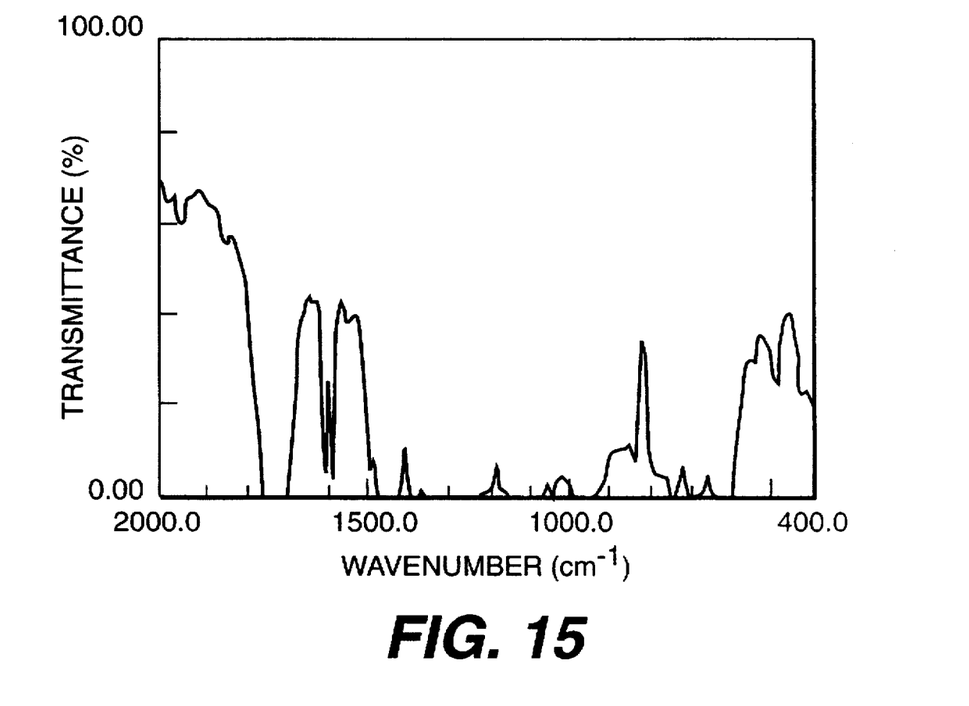
[FIG. 15] is an infrared absorption spectrum of the film of Comparative Example 4.

A film of LDPE was prepared in the similar manner as in Example 12 except that the addition of the infrared absorber of the present invention was omitted, and its heart insulation property and transparency were evaluated. The infrared absorption spectrum is shown in FIG. 15.

COMPARATIVE EXAMPLE 5

Figure 16:
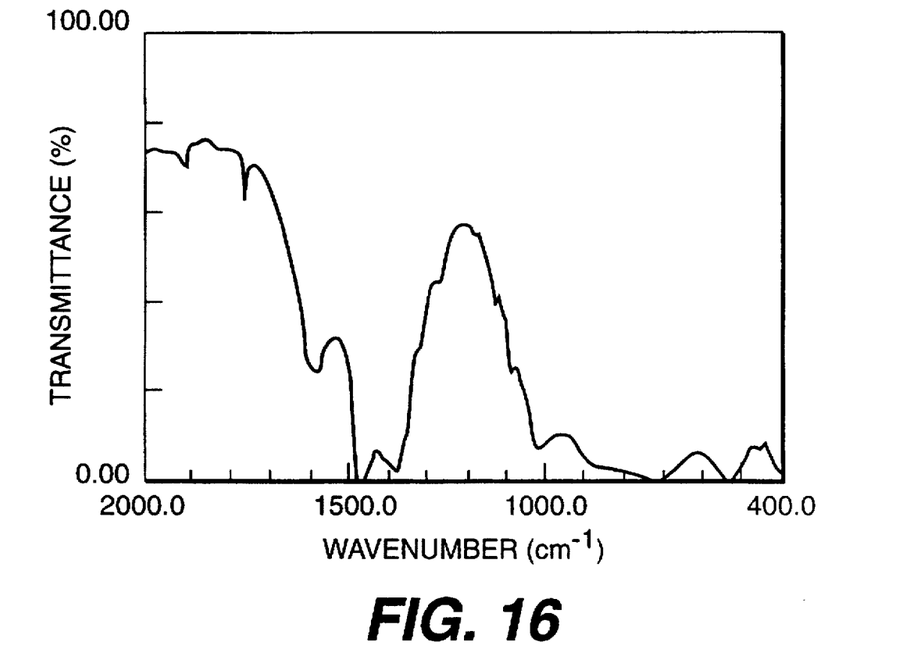
[FIG. 16] is an infrared absorption spectrum of the film of in Comparative Example 5.

An agricultural film was prepared using LDPE resin in the similar manner as in Example 7 except that 10 parts by weight of the infrared absorber obtained in Comparative Example 3 was used in place of the infrared absorber of the present invention, and its heat insulation property and transparency were evaluated. The infrared absorption spectrum is shown in FIG. 16.

COMPARATIVE EXAMPLE 6

Figure 17:
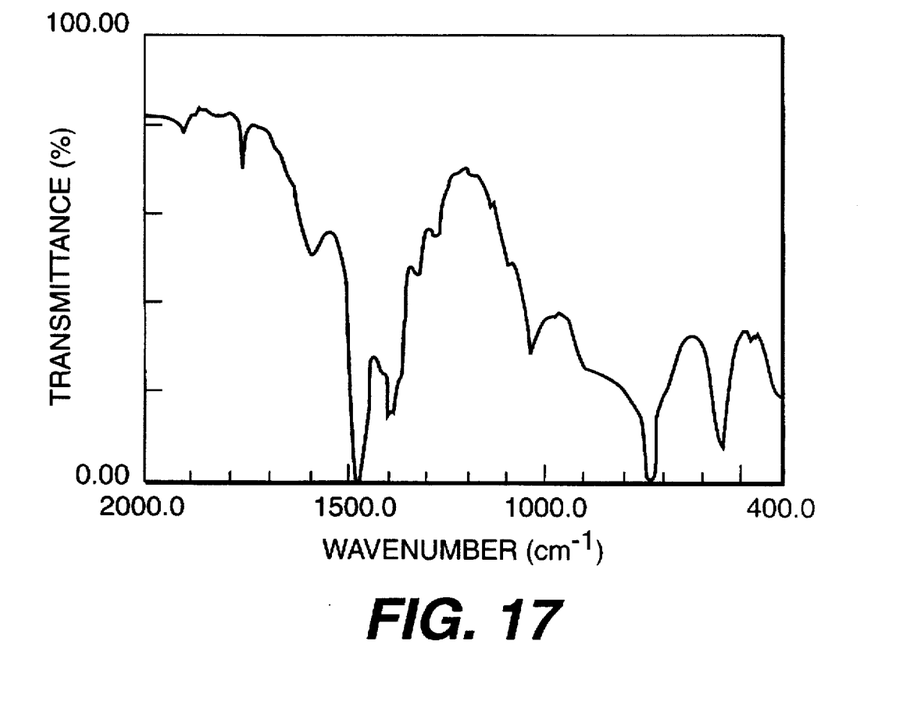
[FIG. 17] is an infrared absorption spectrum of the film of in Comparative Example 6.

An agricultural film was prepared using LDPE resin in the similar manner as in Example 7 except that 5 parts by weight of the infrared absorber obtained in Comparative Example 3 was used in place of the infrared absorber of the present invention, and its heat insulation property and transparency were measured. The infrared absorption spectrum is shown in FIG. 17.

The results of the measurements conducted with respect to the heat insulation property and transparency of the respective films of Examples 7 to 12 and Comparative Examples 1, 2, 4, 5 and 6 are as shown in Table 1.

TABLE 1

|  | Heat Insulation Efficienty | Total Light Transmittance Percent |
| --- | --- | --- |
| Example 7 | 54.21 | 93.9 |
| Example 8 | 56.66 | 92.3 |

TABLE 1-continued

|  | Heat Insulation Efficienty | Total Light Transmittance Percent |
|---|---|---|
| Example 9 | 53.54 | 93.8 |
| Example 10 | 51.23 | 94.0 |
| Example 11 | 50.09 | 94.3 |
| Example 12 | 62.6 | 95.2 |
| Comparative Example 1 | 23.91 | 94.5 |
| Comparative Example 2 | 47.44 | 93.6 |
| Comparative Example 4 | 58.25 | 99.2 |
| Comparative Example 5 | 49.71 | 85.2 |
| Comparative Example 6 | 37.81 | 87.3 |

EXAMPLE 3

An agricultural film of 200 μm in thickness was prepared using T-die from the following formulated composition:

One hundred parts by weight of ethylene-vinyl acetate copolymer (15% of vinyl acetate content), 8 parts by weight of aluminum lithium and magnesium hydroxide complex with condensed silicate (an infrared absorber) (3 hours-burned product) obtained in Example 1, 1.3 parts by weight of anti-fogging agent, diglycerin monostearate, 0.6 part by weight of glycerin monostearate, 0.5 part by weight of light stabilizer "TINUVIN 622" (a trade nama, a product of Ciba Geigy Co., Ltd.), 0.2 part by weight of lubricant, stearylamide, 0.2 part by weight of ultraviolet absorber "TINUVIN 571" (a trade name, a product of Ciba Geigy Co., Ltd.) and 0.1 part by weight of anti-haze agent "Unidyne DS-401" (a trade name, a product of Daikin Industies Ltd.).

EXAMPLE 14

An agricultural film of 200 μm in thickness using a T-die from the following formulated composition:

One hundred parts by weight of ethylene-vinyl acetate (15% of vinyl acetate content), 8 parts by weight of aluminum lithium and magnesium hydroxide complex with condensed silicate (an infrared absorber) (3 hours-burned product) obtained in Example 2, 1.3 parts by weight of anti-fogging agent, diglycerin monostearate, 0.6 part by weight of glycerin monostearate, 0.5 part by weight of light stabilizer "TINUVIN 622" (a trade name, a product of Ciba Geigy Co., Ltd.), 0.2 part by weight of lubricant, stearylamide, 0.2 part by weight of ultraviolet absorber "TINUVIN 571" and 0.1 part by weight of anti-haze agent "KF-354" (a trade name, a product of Shin-Etsu Chemical Industry Co., Ltd.).

EXAMPLE 15

An agricultural film of 200 μm in thickness using a T-die from the following formulated composition:

One hundred parts by weight of polyvinyl chloride (degree of polymerization: 1300), 8 parts by weight of aluminum lithium and magnesium complex hydroxide condensed silicate (an infrared absorber)( 3 hours-burned product) obtained in Example 1, 2.0 parst by weight of heat stabilizer "L-CAM" (a trade name, a product of Fuji Chemical Industry Co., Ltd.) 0.2 part by weight of dibenzoylmethane, 0.4 part by weight of zinc stearate, 50 parts by weight of DOP, 1.3 parts by weight of anti-fogging agent diglycerin monostearate, 0.2 part by weight of ultraviolet absorber "TINUVIN 571" and 0.1 part by weight of anti-haze agent "DS-401".

EXAMPLE 16

An agricultural film of 200 μm in thickness using a T-die from the following formulated composition:

One hundred parts by weight of polyvinyl chloride (degree of polymerization: 1300), 8 parts by weight of aluminum lithium and magnesium hydroxide complex with condensed silicate (an infrared absorber) (3 hours-burned product) obtained in Example 1, 2.0 parts by weight of heat stabilizer "L-CAM" (a trade name, a product of Fuji Chemical Industry Co., Ltd.), 0.2 part by weight of dibenzoylmethane, 0.4 part by weight of zinc stearate, 50 parts by weight of DOP, 1.3 parts by weight of anti-fogging agent diglycerin monostearate, 0.6 part by weight of glycerin monostearate, 0.2 part by weight of ultraviolet absorber "TINUVIN 571" and 0.1 part by weight of anti-haze agent "DS-401".

EXPERIMENTAL EXAMPLE

Each of the agricultural films obatined in the above Examples 13 to 16 was stretched and subjected to outdoor exposure for 8 months of Apr. 1, 1995 to Nov. 30, 1995 under the condition of which its weathering resistance, anti-fogging property and anti-haze property were evaluated in accordance with the following method:

[Evaluation method]

Weathering resistance:

The discoloration (yellowing, browning) and deterioration were checked by visual observation. Also, tensile elongation test was conducted to measure retention of elongation (%) according to JIS K 6781. The retention of 90% or more was estimated to cause no deterioration.

Anti-fogging property:

The formation of water droplets on the film was visually checked through the overall observation of it.

Anti-haze property:

The generation of haze on the film was visually checked through the overall observation of it.

As a result, all the agricultural films obtained in Examples 13 to 16 were found to have no problem with respect to the weathering resistance (neither discoloration nor deterioration is recognized), the water droplet formation inhibitory property (there is no place to form droplet) and the anti-fogging property (no fog generation is recognized).

Industrial Applicability

As explained in the above, the hydroxide complex with condensed silicate represented by the formula (I) in the present invention has a high infrared absorptivity, an excellent dispersibility with the resins and a refractive indix close to that of the resin to be incorporated so that it has advantages of being easily incorporated in the resin and facilitating resin treatment. When a film is made of the resin composition, it has excellent heat insulation property and transparency so that it is suitable as an agricultural film.

I claim:

1. A complex hydroxide condesed silicate represented by the formula (I)

$$[Al_2(Li_{(1-y)}M^{2+}_y)(OH)_6]_2(Si_yO_{2y+1}{}^{2-})_{1+x} \cdot mH_2O \qquad (I)$$

wherein $M^{2+}$ is a divalent metal, and m, x and y are numbers respectively in the ranges of $0 \leq m \leq 5$, $0 \leq x < 1$ and $2 \leq y \leq 4$.

2. The hydroxide complex with condensed silicate as claimed in claim 1 which has a refractive index of 1.48 to 1.52, whose X-ray diffraction pattern exhibits lattice spacing of 10 to 13 Å at an index of plane (002) and whose infrared ray absorbing capacity lies in the range of 850 to 1150 cm$^{-1}$.

3. The hydroxide complex with condensed silicate as claimed in claim 1, wherein $M^{2+}$ is $Mg^{2+}$.

4. A process for preparing a hydroxide complex with condensed silicate as claimed in claim 1 which comprises reacting a hydroxide complex with salt represented by the formula (II)

(II)

wherein $M^{2+}$ is a divalent metal, m is a number in the range of $0 \leq m < 5$, x is a number in the range of $0 \leq x < 1$ and $A^{n-}$ is one or more of anions having a valence of n and is selected from the group consisting of halogen ion, nitric acid ion, sulfuric acid ion and monocarboxylic acid ion with a condensed silicate ion-supplying compound thereby effecting the substitution of $A^{n-}$ for a condensed silicate ion.

5. An infrared absorber containing as an effective ingredient a hydroxide complex with condensed silicate as claimed in claim 1.

6. An infrared absorber wherein a hydroxide complex with condensed silicate as claimed in claim 1 is coated with one or more of compounds selected from higher fatty acids, higher fatty acid salts, esters of higher aliphatic alcohol and phosphoric acid, waxes, nonionic surfactants, cationic surfactants, amphoteric surfactants and coupling agents.

7. An agricultural film made of a resin composition comprising 1 to 50 parts by weight of hydroxide complex with condensed silicate as claimed in claim 1 per 100 parts by weight of a resin.

8. An agricultural film made of a resin composition comprising 1 to 50 parts by weight of a hydroxide complex with condensed silicate as claimed in claim 1 and 0.02 to 5 parts by weight of a hindered amine light stabilizer per 100 parts by weight of a resin.

9. An agricultural film made of a resin composition comprising 1 to 50 parts by weight of a hydroxide complex with condensed silicate and 0.02 to 5 parts by weight of anti-fogging agent per 100 parts by weight of a resin.

* * * * *